United States Patent
Dawkins et al.

(10) Patent No.: US 9,104,645 B2
(45) Date of Patent: Aug. 11, 2015

(54) SYSTEM AND METHOD OF REPLICATING VIRTUAL MACHINES FOR LIVE MIGRATION BETWEEN DATA CENTERS

(75) Inventors: William P. Dawkins, Austin, TX (US); Gaurav Chawla, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 225 days.

(21) Appl. No.: 13/560,482

(22) Filed: Jul. 27, 2012

(65) Prior Publication Data

US 2014/0033201 A1 Jan. 30, 2014

(51) Int. Cl.
G06F 9/455 (2006.01)
G06F 13/00 (2006.01)
G06F 7/00 (2006.01)
G06F 11/20 (2006.01)
G06F 11/14 (2006.01)

(52) U.S. Cl.
CPC .......... *G06F 11/203* (2013.01); *G06F 9/45558* (2013.01); *G06F 11/1484* (2013.01); *G06F 11/2069* (2013.01); *G06F 11/2074* (2013.01); *G06F 11/2082* (2013.01); *G06F 11/2038* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 7,203,944 B1 * | 4/2007 | van Rietschote et al. | 718/104 |
| 7,219,103 B2 | 5/2007 | Vasudevan et al. | |
| 8,499,297 B2 * | 7/2013 | Chen et al. | 718/1 |
| 2005/0041684 A1 | 2/2005 | Reynolds et al. | |
| 2005/0131965 A1 | 6/2005 | Lam et al. | |
| 2005/0251785 A1 | 11/2005 | Vertes et al. | |
| 2009/0025007 A1 * | 1/2009 | Hara et al. | 718/105 |
| 2011/0145380 A1 * | 6/2011 | Glikson et al. | 709/223 |
| 2013/0219138 A1 * | 8/2013 | Nasu et al. | 711/162 |

OTHER PUBLICATIONS

"Virtual Machine Mobility with VMWare VMotion and Cisco Data Center Interconnect Technologies," Cisco vmware, 2009, pp. 1-17.

* cited by examiner

*Primary Examiner* — Lewis A Bullock, Jr.
*Assistant Examiner* — Jacob Dascomb
(74) *Attorney, Agent, or Firm* — Larson Newman, LLP

(57) ABSTRACT

A method includes providing a storage volume at a processing site, directing a storage controller of the processing site to asynchronously mirror the storage volume to another storage volume of another processing site that is remote from the first processing site, determining to migrate a virtual machine of the first processing site that is associated with the first storage volume to the second processing site, synchronizing the first and second storage volumes in response to the migration, live migrating the virtual machine to the second processing site and a second virtual machine of the second processing site with the second storage volume, and directing a second storage controller of the second processing site to asynchronously mirror the second storage volume to the first storage volume.

20 Claims, 3 Drawing Sheets

SYSTEM AND METHOD OF REPLICATING VIRTUAL MACHINES FOR LIVE MIGRATION BETWEEN DATA CENTERS

FIELD OF THE DISCLOSURE

This disclosure relates generally to information handling systems, and relates more particularly to migration of virtual machines between data centers.

BACKGROUND

As the value and use of information continues to increase, individuals and businesses seek additional ways to process and store information. One option is an information handling system. An information handling system generally processes, compiles, stores, or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, data storage systems, and networking systems. An information handling system can include virtual machines that run operating systems and applications on a common host system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are illustrated and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion focuses on specific implementations and embodiments of the teachings. This focus is provided to assist in describing the teachings, and should not be interpreted as a limitation on the scope or applicability of the teachings. However, other teachings can be used in this application. The teachings cane also be used in other applications, and with several different types of architectures, such as distributed computing architectures, client/server architectures, or middleware server architectures and associated resources.

Figure 1:
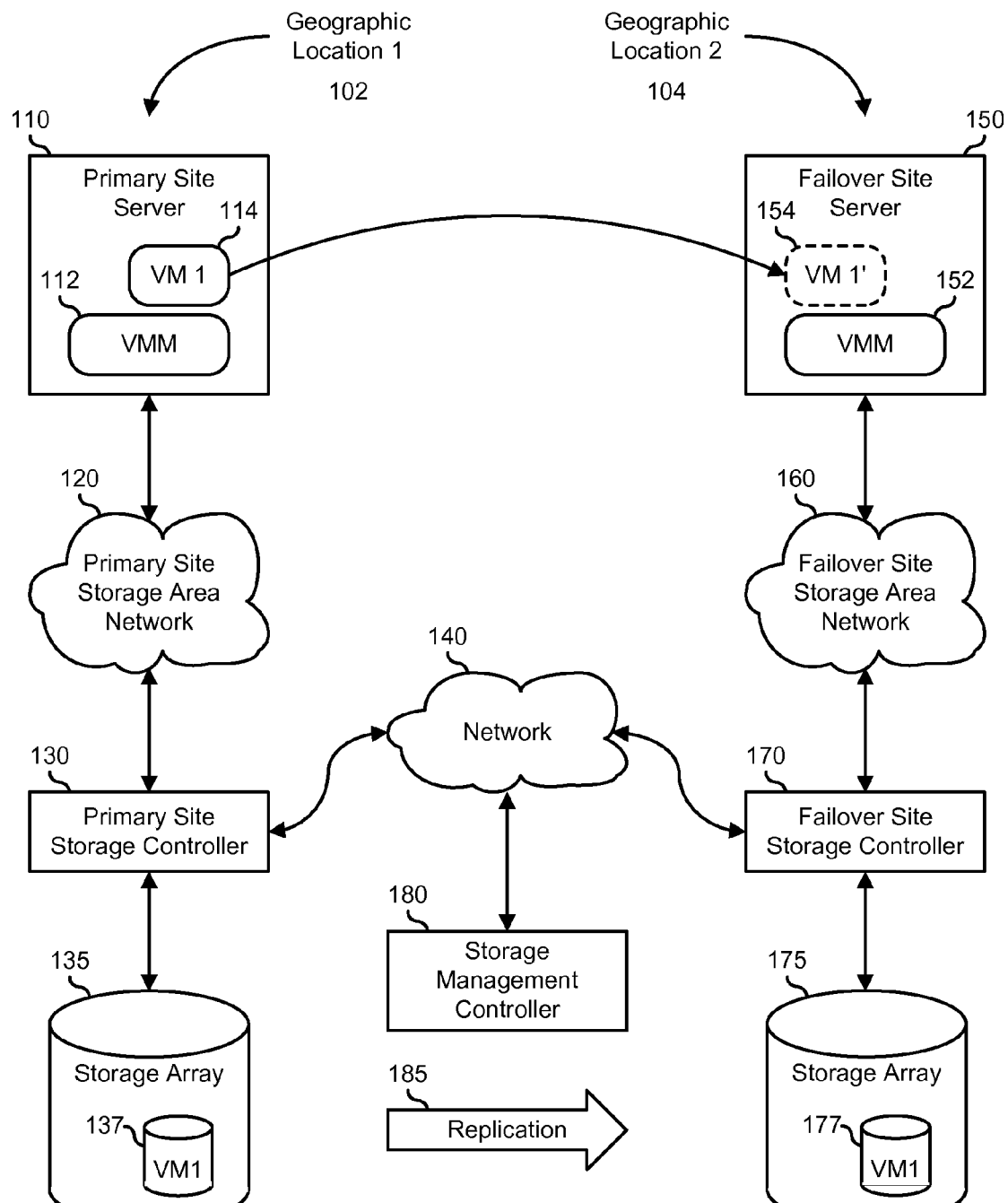
FIG. 1 is a block diagram of a geographically dispersed network according to an embodiment of the present disclosure.

FIG. 1 illustrates a geographically dispersed network 100. Geographically dispersed network 100 includes a primary geographic location processing site 102, a remote geographic location processing site 104, and a storage management controller 180 that are connected together via a network 140, such as the Internet, a private network, another network, or a combination thereof. Primary site 102 includes an information handling system such as a server 110, a storage area network (SAN) 120, a storage controller 130, and a storage array 135. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic, and operates to execute code. Additional components of the information handling system may include one or more storage devices that can store code, one or more communications ports for communicating with external devices as well as various input and output (I/O) devices, such as a keyboard, a mouse, and a video display. The information handling system may also include one or more buses operable to transmit communications between the various hardware components.

Server 110 includes a virtual machine manager (VMM) 112 that operates to instantiate a virtual machine (VM) 114 on the server. SAN 120 is a network of primary site 102 that provides a manageable, secure access by server 110 to data storage resources of the primary site, such as storage controller 130 and storage array 135. As such, SAN 120 is connected to server 110 via a network connection, such as an Ethernet connection. SAN 120 operates to present the storage resources to server 110 as if the storage resources were locally attached devices to the server. Thus, server 110 is adapted to transfer data to and from storage array 135 through SAN 120 via a network adapted local interface, such as an Internet Small Computer System Interface (iSCSI), a Serial Attached SCSI (SAS) interface, an external Peripheral Component Interconnect Express (ePCIe) interface, a Fibre Channel (FC) interface, a Fibre Channel over Ethernet (FCoE) interface, another interface, or a combination thereof.

When VMM 112 instantiates VM 114 on server 110, the VMM directs storage controller 130 to designate a storage volume 137 from the storage capacity of storage array 135, and allocates the storage volume to the VM. An example of storage volume 137 includes a storage volume created in accordance with a VMDK (Virtual Machine Disk) format, a VMware API Program for I/O Demux (vVoL) format, a Virtual Hard Disk (VHD) format, a direct mapped volume format, another format, or a combination thereof. In particular, storage volume 137 can be identified with VM 114 by being assigned a particular logical unit number (LUN) on SAN 120, and providing the VM with the LUN and the access credentials to access the storage volume. VMM 112 also operates to instantiate additional VMs on server 110 and to provide one or more of the VMs with access to storage volume 137. In a particular embodiment, storage volume 137 represents a datastore that is mirrored to storage volume 177. As such, the data associated with storage volume 137 is sent to storage volume 177, rather than mirroring a virtual machine disk associated with storage volume 137 to storage volume 177. In another embodiment, Primary site 102 includes one or more additional servers similar to server 110. Each of the additional servers includes a VMM similar to VMM 112, and is connected to SAN 120, such that the additional servers can transfer data to and from storage array 135 through SAN 120 via network adapted local interfaces. In a particular embodiment, primary site 102 operates such that VMs can be migrated between servers. For example, a VMM on one of the additional servers can instantiate a VM similar to VM 114 and can provide the VM with access to storage volume 137. Then execution of the processing tasks of VM 114 can be halted and a checkpoint created. Then the processing can be resumed by the newly instantiated VM at the checkpoint. The migration can be performed because a failover event occurred on server 110, because server 110 is being maintained, because another server of primary site 102 is less heavily loaded than server 110, or for another reason, as needed or desired. For example, the other server may have more processing capacity than server 110, may have more available internal memory than server 110, may have greater available network bandwidth than server 110, may be less heavily loaded in some other capability, or a combination thereof. In another embodiment, after instantiating a new VM on another server of primary site 102, the VMM of the other server directs storage controller 130 to designate a storage volume similar to storage volume 137 from the storage capacity of storage array 135 and directs the storage controller to mirror the data stored on storage volume 137 to the new storage volume. When the mirroring is completed, storage controller 135 indicates to the VMM of the other server that the storage volumes are synchronized, and the VMM directs VMM 112 to halt the processing tasks of VM 114 and to create a checkpoint. Then the processing is resumed by the newly instantiated VM at the checkpoint. In a particular embodiment, there are hidden files that belong to VMM 112 and VMM 152 that need to by synchronously mirrored as a migration event is happening. The hidden files are stored in a datastore associated with the virtual machine disk of storage volume 137, and are provided to storage volume 177 when VM 114 is migrated.

Primary site 102 also operates to perform live migrations of VMs between servers. In a live migration, the processing tasks of a particular VM are not halted with the creation of a checkpoint. Rather in a live migration, the local memory of the VM to be migrated (that is, the server memory allocated to the VM) is mirrored to the local memory of the target server, the local memory of the target server is allocated to the target VM, and other machine states of servers are synchronized. An example of a machine state includes processor register contents, processor status, non-pageable memory contents, processor cache contents, or other machine states, as needed or desired. Then, the VM to be migrated halts execution and the target VM proceeds with the execution from that point onward. In addition to processor and server memory synchronization, the network and storage connectivity is duplicated on the target VM. As such, the target VM is given access to the storage volume of the VM to be migrated.

Remote site 104 includes a server 150 similar to server 110, a SAN 160 similar to SAN 120, a storage controller 170 similar to storage controller 130, and a storage array 175 similar to storage array 135. Server 150 includes a VMM 152 similar to VMM 112. SAN 160 is a network of remote site 104 that provides a manageable, secure access by server 150 storage controller 170 and storage array 175, and server 150 is adapted to transfer data to and from storage array 175 through SAN 160 via a network adapted local interface.

Remote site 104 operates as a geographically remote backup and failover site to primary site 102. As such, storage management controller 180 operates to direct primary site 102 to replicate 185 itself onto remote site 104, so that in the event of an emergency, or when the primary site is undergoing maintenance, the operation of VM 114 is carried out by the remote site without a disruption in the services provided by the VM. In particular, the data stored on storage array 135 is mirrored onto storage array 175. For example, storage volume 137 can be replicated as storage volume 177 in storage array 175. In a particular embodiment, replication 185 is performed between storage arrays 135 and 175 asynchronously. Geographically dispersed network 100 operates such that VMs can be migrated between primary site 102 and remote site 104. For example VMM 152 can instantiate VM 154, labeled VM1', similar to VM 114 and can provide VM1' with access to storage volume 177. The execution of the processing tasks of VM 114 can be halted and a checkpoint created, and the processing can be resumed by VM1' at the checkpoint. The migration can be performed because a failover event occurred on primary site 102, because server 110 is being maintained, because server 150 is less heavily loaded than server 110, or for another reason, as needed or desired. In another embodiment, after instantiating VM 154, VMM 152 directs storage controller 160 to designate storage volume 177 from the storage capacity of storage array 175 and directs the storage controller to replicate the data stored on storage volume 137 to storage volume 177. When the replication is completed, storage controller 175 indicates to VMM 152 that storage volumes 137 and 177 are synchronized, and VMM 152 directs VMM 112 to halt the processing tasks of VMM 114 and to create a checkpoint. Then the VMM 152 initiates the processing of VM 114 on VMM 154 at the checkpoint. Geographically dispersed network 100 also operates to perform live migrations of VMs between primary site 102 and remote site 104.

Figure 2:
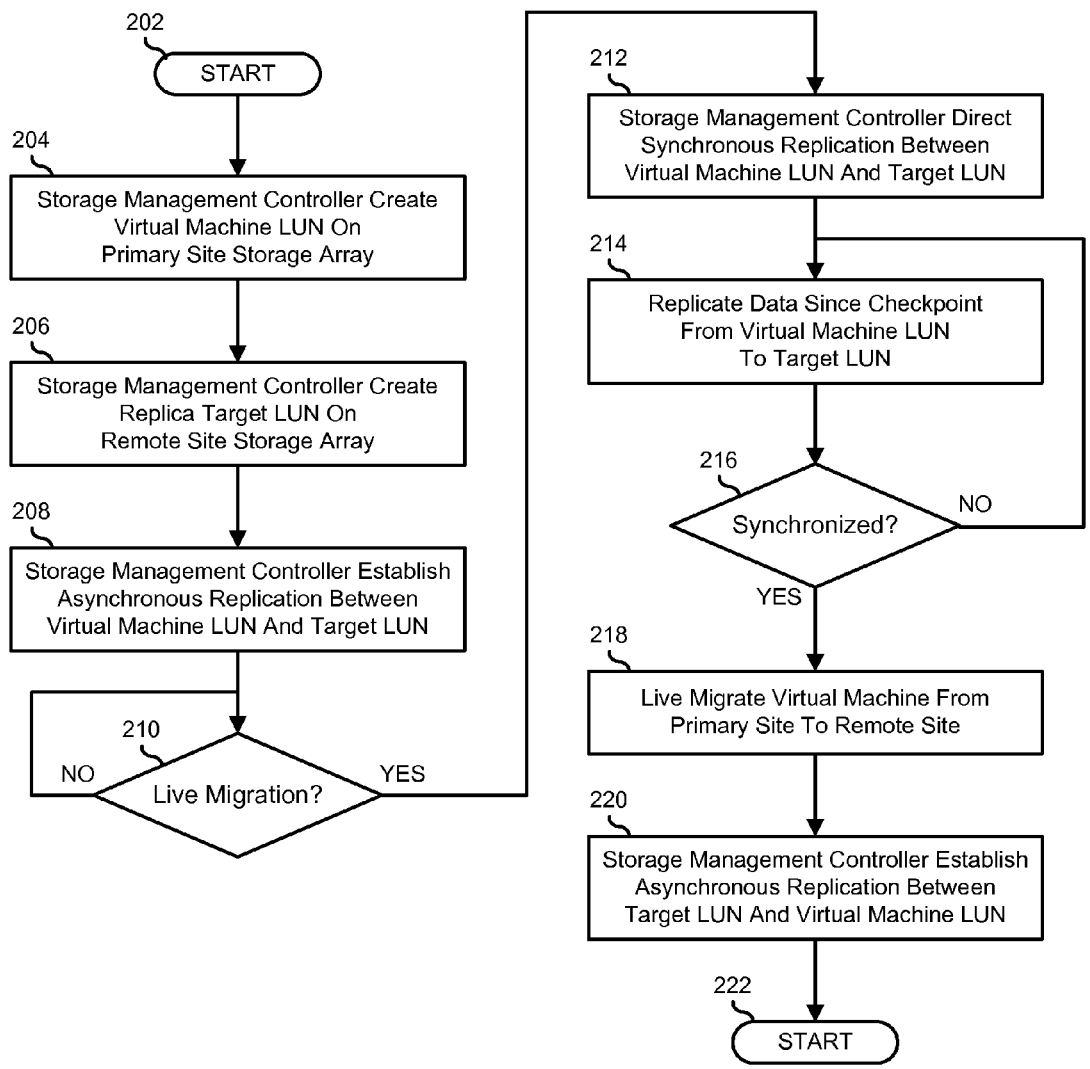
FIG. 2 is a flow diagram of a method of providing hybrid synchronous-asynchronous replication of virtual machines for live migration between data centers according to an embodiment of the present disclosure.

FIG. 2 illustrates a method of providing hybrid synchronous-asynchronous replication of virtual machines for live migration between data centers according to an embodiment of the present disclosure, starting at block 202. A storage management controller creates a LUN associated with a virtual machine on a storage array of a primary processing site in block 204. For example, storage management controller 180 can direct storage controller 130 to create storage volume 137 on storage array 135, and to provide a LUN associated with the storage volume to hypervisor 112 to be assigned to VM 114. In a particular embodiment, a storage management utility permits a network service technician to direct the storage controller to create the LUN, and a virtualization management utility permits the technician to instantiate the VM. The storage management controller creates a LUN on a storage array of a remote processing site in block 206. For example, storage management controller 180 can direct storage controller 170 to create storage volume 177 on storage array 175.

The storage management controller establishes an asynchronous replication between the primary site LUN and the remote site LUN in block 208. For example, storage management controller 180 can direct storage controller 130 to replicate 180 the data stored on storage volume 137 onto storage volume 177. In a particular embodiment, the storage management controller establishes a checkpoint interval for the replication of the data between the primary site LUN and the remote site LUN. A decision is made as to whether a live migration has been initiated in decision block 210. For example the technician can determine that remote site 104 includes a server such as server 150 that is less heavily loaded than server 110, and can decide to migrate VM 114 onto server 150. If not, the "NO" branch of decision block 210 is taken, and the method loops to the decision block until a live migration is initiated.

If a live migration has been initiated, the "YES" branch of decision block 210 is taken, and the storage management controller establishes synchronous replication between the primary site LUN and the remote site LUN in block 212. Here, a virtualization management controller can halt the live migration of the VM between the primary site and the remote site until the virtualization management controller receives an indication that the primary site LUN and the remote site LUN are synchronized. In response to establishing the synchronous replication between the primary site LUN and the remote site LUN, the storage management controller directs the storage controller of the primary site to send any data that has been changed on the primary site LUN since the last previous checkpoint to the remote site LUN in block 214. The skilled artisan will understand that some or all of the changed data on the primary site LUN may have been sent to the remote site LUN as a part to the asynchronous replication, and that therefore, any data already sent to the remote site LUN may not need to be resent. Also, the VM on the primary site can continue execution whole the primary site LUN and the remote site LUN are synchronized, and that therefore the time to achieve full synchronization of the primary site LUN and the remote site LUN may be extended due to writes from the VM to the primary site LUN. In a particular embodiment, this time can be reduced by directing the storage controller of the primary site to issue writes from the VM to both the primary site LUN and the remote site LUN.

A decision is made as to whether or not the primary site LUN and the remote site LUN have achieved full synchronization in decision block 216. If not, the "NO" branch of decision block 216 is taken and the method loops back to block 214 where the storage controller continues to send the changed data to the remote site LUN until the primary site LUN and the remote site LUN are synchronized. If the primary site LUN and the remote site LUN have achieved full synchronization, the "YES" branch of decision block 216 is taken and the virtualization management controller initiates the live migration of the VM between the primary site and the remote site in block 218. For example, VM 114 can be migrated to VM 154 as described above. The storage management controller establishes an asynchronous replication between the remote site LUN and the primary site LUN in block 220, and the method ends in block 222.

Figure 3:
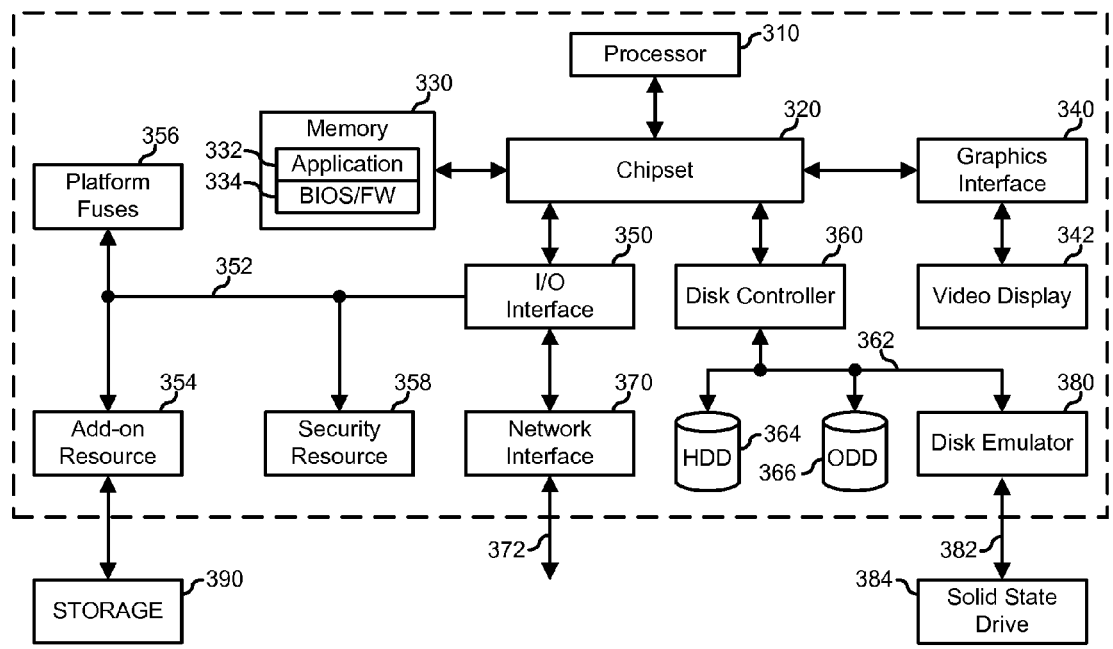
FIG. 3 is a functional block diagram illustrating an exemplary embodiment of an information handling system.

FIG. 3 is a block diagram illustrating an embodiment of an information handling system 300, including a processor 310, a chipset 320, a memory 330, a graphics interface 340, an input/output (I/O) interface 350, a disk controller 360, a network interface 370, and a disk emulator 380. In a particular embodiment, information handling system 300 is used to carry out one or more of the methods described herein. In another embodiment, one or more of the systems described herein are implemented in the form of information handling system 300.

Chipset 320 is connected to and supports processor 310, allowing the processor to execute machine-executable code. In a particular embodiment, information handling system 300 includes one or more additional processors, and chipset 320 supports the multiple processors, allowing for simultaneous processing by each of the processors and permitting the exchange of information among the processors and the other elements of the information handling system. Chipset 320 can be connected to processor 310 via a unique channel, or via a bus that shares information among the processor, the chipset, and other elements of information handling system 300.

Memory 330 is connected to chipset 320. Memory 330 and chipset 320 can be connected via a unique channel, or via a bus that shares information among the chipset, the memory, and other elements of information handling system 300. In another embodiment (not illustrated), processor 310 is connected to memory 330 via a unique channel. In another embodiment (not illustrated), information handling system 300 includes separate memory dedicated to each of the one or more additional processors. A non-limiting example of memory 330 includes static random access memory (SRAM), dynamic random access memory (DRAM), non-volatile random access memory (NVRAM), read only memory (ROM), flash memory, another type of memory, or any combination thereof.

Graphics interface 340 is connected to chipset 320. Graphics interface 340 and chipset 320 can be connected via a unique channel, or via a bus that shares information among the chipset, the graphics interface, and other elements of information handling system 300. Graphics interface 340 is connected to a video display 342. Other graphics interfaces (not illustrated) can also be used in addition to graphics interface 340 as needed or desired. Video display 342 includes one or more types of video displays, such as a flat panel display, another type of display device, or any combination thereof.

I/O interface 350 is connected to chipset 320. I/O interface 350 and chipset 320 can be connected via a unique channel, or via a bus that shares information among the chipset, the I/O interface, and other elements of information handling system 300. Other I/O interfaces (not illustrated) can also be used in addition to I/O interface 350 as needed or desired. I/O interface 350 is connected via an I/O interface 352 to one or more add-on resources 354. Add-on resource 354 is connected to a storage system 390, and can also include another data storage system, a graphics interface, a network interface card (NIC), a sound/video processing card, another suitable add-on resource or any combination thereof. I/O interface 350 is also connected via I/O interface 352 to one or more platform fuses 356 and to a security resource 358. Platform fuses 356 function to set or modify the functionality of information handling system 300 in hardware. Security resource 358 provides a secure cryptographic functionality and includes secure storage of cryptographic keys. A non-limiting example of security resource 358 includes a Unified Security Hub (USH), a Trusted Platform Module (TPM), a General Purpose Encryption (GPE) engine, another security resource, or a combination thereof.

Disk controller 360 is connected to chipset 320. Disk controller 360 and chipset 320 can be connected via a unique channel, or via a bus that shares information among the chipset, the disk controller, and other elements of information handling system 300. Other disk controllers (not illustrated) can also be used in addition to disk controller 360 as needed or desired. Disk controller 360 includes a disk interface 362. Disk controller 360 is connected to one or more disk drives via disk interface 362. Such disk drives include a hard disk drive (HDD) 364, and an optical disk drive (ODD) 366, and can include one or more disk drive as needed or desired. ODD 366 can include a Read/Write Compact Disk (R/W-CD), a Read/Write Digital Video Disk (R/W-DVD), a Read/Write mini Digital Video Disk (R/W mini-DVD), another type of optical disk drive, or any combination thereof. Additionally, disk controller 360 is connected to disk emulator 380. Disk emulator 380 permits a solid-state drive 384 to be coupled to information handling system 300 via an external interface 382. External interface 382 can include industry standard busses such as USB or IEEE 1394 (Firewire) or proprietary busses, or any combination thereof. Alternatively, solid-state drive 384 can be disposed within information handling system 300.

Network interface device 370 is connected to I/O interface 350. Network interface 370 and I/O interface 350 can be coupled via a unique channel, or via a bus that shares information among the I/O interface, the network interface, and other elements of information handling system 300. Other network interfaces (not illustrated) can also be used in addition to network interface 370 as needed or desired. Network interface 370 can be a network interface card (NIC) disposed within information handling system 300, on a main circuit board such as a baseboard, a motherboard, or any combination thereof, integrated onto another component such as chipset 320, in another suitable location, or any combination thereof. Network interface 370 includes a network channel 372 that provide interfaces between information handling system 300 and other devices (not illustrated) that are external to information handling system 300. Network interface 370 can also include additional network channels (not illustrated).

Information handling system 300 includes one or more application programs 332, and Basic Input/Output System and Firmware (BIOS/FW) code 334. BIOS/FW code 334 functions to initialize information handling system 300 on power up, to launch an operating system, and to manage input and output interactions between the operating system and the other elements of information handling system 300. In a particular embodiment, application programs 332 and BIOS/FW code 334 reside in memory 330, and include machine-executable code that is executed by processor 310 to perform various functions of information handling system 300. In another embodiment (not illustrated), application programs and BIOS/FW code reside in another storage medium of information handling system 300. For example, application programs and BIOS/FW code can reside in HDD 364, in a ROM (not illustrated) associated with information handling system 300, in an option-ROM (not illustrated) associated with various devices of information handling system 300, in storage system 390, in a storage system (not illustrated) associated with network channel 372, in another storage medium of information handling system 300, or a combination thereof. Application programs 332 and BIOS/FW code 334 can each be implemented as single programs, or as separate programs carrying out the various features as described herein.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
providing, by a storage controller, a first storage volume at a first processing site;
providing a first virtual machine at the first processing site, wherein the first virtual machine is associated with the first storage volume;
in response to providing the first virtual machine, directing the storage controller to mirror the first storage volume to a second storage volume of a second processing site, wherein the storage controller mirrors the first storage volume to the second storage volume asynchronously, and wherein the second processing site is remote from the first processing site;

after directing the storage controller to mirror the first storage volume to the second storage volume, determining to migrate the first virtual machine to the second processing site;
synchronizing the second storage volume with the first storage volume in response to determining to migrate the first virtual machine, wherein the synchronizing comprises switching from asynchronous replication to direct synchronous replication;
while performing the direct synchronous replication of the second storage volume with the first storage volume, operating the first virtual machine such that a storage operation of the first virtual machine is directed to the first storage volume;
receiving an indication that the first storage volume and the second storage volume are synchronized;
in response to receiving the indication, by the storage controller, live migrating the first virtual machine, by a virtualization controller, to the second processing site, wherein the live migration operates to associate a second virtual machine of the second processing site with the second storage volume; and
directing the storage controller to mirror the second storage volume to the first storage volume, wherein the storage controller mirrors the second storage volume to the first storage volume asynchronously, and wherein the directing comprises switching from the direct synchronous replication to asynchronous replication.

2. The method of claim 1, wherein the asynchronous mirroring of the first storage volume to the second storage volume is performed in response to a first checkpoint.

3. The method of claim 2, wherein synchronizing the second storage volume with the first storage volume comprises sending data written to the first storage volume after a prior checkpoint to the second storage volume.

4. The method of claim 2, wherein the checkpoint is determined in response to a predetermined time interval.

5. The method of claim 1, wherein the first storage volume is assigned a first logical unit number associated with the first virtual machine.

6. The method of claim 5, wherein the second storage volume is assigned a second logical unit number and is associated with the second virtual machine.

7. The method of claim 1, wherein determining to migrate the first virtual machine to the second processing site is in response to load balancing between the first processing site and the second processing site.

8. A storage controller comprising:
a memory; and
a processor operable to:
provide a first storage volume at a first processing site;
provide a first virtual machine at the first processing site, wherein the first virtual machine is associated with the first storage volume;
in response to providing the first virtual machine, mirror the first storage volume to a second storage volume of a second processing site, wherein the storage controller mirrors the first storage volume to the second storage volume asynchronously, wherein the processor establishes a checkpoint interval for the asynchronous mirroring of the first storage volume to the second storage volume, and wherein the second processing site is remote from the first processing site;
after directing the storage controller to mirror the first storage volume to the second storage volume, determine to migrate the first virtual machine to the second processing site;
in response to determining to migrate the first virtual machine to the second processing site, send data that has been changed on the first storage volume subsequent to a last previous checkpoint interval to the second storage volume;
synchronize the second storage volume with the first storage volume in response to determining to migrate a first virtual machine to the second processing site, wherein the synchronizing comprises switching from asynchronous replication to direct synchronous replication;
while performing the direct synchronous replication of the second storage volume with the first storage volume, operate the first virtual machine such that a storage operation of the first virtual machine is directed to the first storage volume;
receive an indication that the first storage volume and the second storage volume are synchronized;
in response to receiving the indication, live migrate the first virtual machine to the second processing site, wherein the live migration operates to associate a second virtual machine of the second processing site with the second storage volume; and
mirror the second storage volume to the first storage volume in response to the live migration of the first virtual machine to the second processing site wherein the second storage volume is mirrored to the first storage volume asynchronously, and wherein the mirroring comprises switching from the direct synchronous replication to the asynchronous replication.

9. The storage controller of claim 8, wherein the asynchronous mirroring of the first storage volume to the second storage volume is performed in response to a first checkpoint.

10. The storage controller of claim 9, wherein synchronizing the second storage volume with the first storage volume comprises sending data written to the first storage volume after a prior checkpoint to the second storage volume.

11. The storage controller of claim 9, wherein the checkpoint is determined in response to a predetermined time interval.

12. The storage controller of claim 8, wherein the processor is further operable to assign a first logical unit number associated with the first virtual machine to the first storage volume.

13. The storage controller of claim 12, wherein the processor is further operable to assign a second logical unit number to the second storage volume.

14. The storage controller of claim 8, wherein determining to migrate the first virtual machine to the second processing site is in response to load balancing between the first processing site and the second processing site.

15. A non-transitory computer-readable medium including code for performing a method, the method comprising:
providing, by a storage controller, a first storage volume at a first processing site;
providing a first virtual machine at the first processing site, wherein the first virtual machine is associated with the first storage volume;
in response to providing the first virtual machine, directing the storage controller of the first processing site to mirror the first storage volume to a second storage volume of a second processing site, wherein the storage controller mirrors the first storage volume to the second storage volume asynchronously, and wherein the second processing site is remote from the first processing site;

after directing the storage controller to minor the first storage volume to the second storage volume, determining to migrate the first virtual machine to the second processing site;

synchronizing the second storage volume with the first storage volume in response to determining to migrate the first virtual machine, wherein the synchronizing comprises switching from asynchronous replication to direct synchronous replication;

while performing the direct synchronous replication of the second storage volume with the first storage volume, operating the first virtual machine such that a storage operation of the first virtual machine is directed to the first storage volume and to the second storage volume;

receiving an indication that the first storage volume and the second storage volume are synchronized;

in response to receiving the indication, live migrating the first virtual machine to the second processing site, wherein the live migration operates to associate a second virtual machine of the second processing site with the second storage volume; and directing the storage controller to mirror the second storage volume to the first storage volume, wherein the storage controller mirrors the second storage volume to the first storage volume asynchronously, and wherein the mirroring comprises switching from the direct synchronous replication to the asynchronous replication.

16. The computer-readable medium of claim 15, wherein the asynchronous mirroring of the first storage volume to the second storage volume is performed in response to a first checkpoint.

17. The computer-readable medium of claim 16, wherein synchronizing the second storage volume with the first storage volume comprises sending data written to the first storage volume after a prior checkpoint to the second storage volume.

18. The computer-readable medium of claim 15, wherein the first storage volume is assigned a first logical unit number associated with the first virtual machine.

19. The computer-readable medium of claim 18, wherein the second storage volume is assigned a second logical unit number and is associated with the second virtual machine.

20. The computer-readable medium of claim 15, wherein determining to migrate the first virtual machine to the second processing site is in response to load balancing between the first processing site and the second processing site.

\* \* \* \* \*

UNITED STATES PATENT AND TRADEMARK OFFICE
CERTIFICATE OF CORRECTION

PATENT NO. : 9,104,645 B2
APPLICATION NO. : 13/560482
DATED : August 11, 2015
INVENTOR(S) : William P. Dawkins and Gaurav Chawla It is certified that error appears in the above-identified patent and that said Letters Patent is hereby corrected as shown below:

Claims

Col. 9, Line 1, Claim 1, change "after directing the storage controller to minor the first storage volume to the second storage volume, determining to migrate the first virtual machine to the second processing site" to --after directing the storage controller to mirror the first storage volume to the second storage volume, determining to migrate the first virtual machine to the second processing site--

Col. 9, Line 55, Claim 8, change "in response to providing the first virtual machine, minor the first storage volume to a second storage volume of a second processing site, wherein the first storage controller mirrors the first storage volume to the second storage volume asynchronously, wherein the processor establishes a checkpoint interval for the asynchronous mirroring of the first storage volume to the second storage volume, and wherein the second processing site is remote from the first processing site" to --in response to providing the first virtual machine, mirror the first storage volume to a second storage volume of a second processing site, wherein the first storage controller mirrors the first storage volume to the second storage volume asynchronously, wherein the processor establishes a checkpoint interval for the asynchronous mirroring of the first storage volume to the second storage volume, and wherein the second processing site is remote from the first processing site--

Col. 11, Line 1, Claim 15, change "after directing the storage controller to minor the first storage volume to the second storage volume, determining to migrate the first virtual machine to the second processing site" to --after directing the storage controller to mirror the first storage volume to the second storage volume, determining to migrate the first virtual machine to the second processing site--

Signed and Sealed this
Twenty-eighth Day of June, 2016

Michelle K. Lee
*Director of the United States Patent and Trademark Office*